Figure 1:
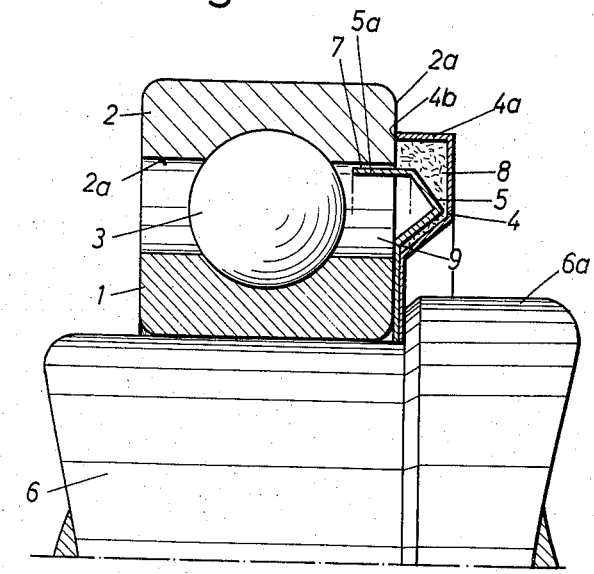

United States Patent Office 3,250,580
Patented May 10, 1966

3,250,580
SEAL FOR GREASE-LUBRICATED ANTIFRICTION BEARINGS
Hans Sikora, Dusseldorf, Germany, assignor to Hans Ziller, Millrath uber Hochdahl, Germany
Filed Oct. 15, 1963, Ser. No. 316,382
Claims priority, application Germany, Oct. 16, 1962, Z 9,719
1 Claim. (Cl. 308—187.1)

The present invention relates to a seal for grease-lubricated antifriction bearings which consist of two sealing discs arranged one behind the other. These sealing discs are firmly connected to each other and when installed in an antifriction bearing are firmly clamped against one race ring in such a way that they are biased against and engage the other race ring along one or more sealing edges in a sealing manner. In order to improve the effect of such seals, it is advantageous to interpose a felt packet or another sealing packet between the two sealing discs.

The two sealing discs of an antifriction bearing seal of the above-mentioned type frequently consist of metal so that they can be produced as thin as possible in order that the friction occurring at the sealing edge of the respective disc or discs engaging the respective race ring will be kept to a minimum to thereby keep the heat development to a minimum. In view of the frequently necessary high speed of antifriction bearings, for instance when used in connection with high speed electric motors, it is necessary that such metallic seals greatly reduce the disadvantageous friction. On the other hand, the employment of two sealing discs has proved highly advantageous so that in many instances the use of two sealing discs is imperative.

Therefore, it has been suggested to supplement a sealing disc clamped against one race ring and sealingly engaging the other race ring by a marginal portion substantially perpendicular to said other race ring by a second race ring which likewise resiliently engages said other race ring and, for instance, has its free edge in frictional engagement with the inner wall of the bore of the outer race ring. Such a seal is to be employed particularly when a high oil pressure is employed in the bearing, because the second sealing disc engaging the bore surface of the outer race ring presses the sealing edge under the effect of a strong oil pressure at a still greater pressure against the inner bore of the bearing and therefore supposedly further improves the seal.

When grease-lubricated antifriction bearings are employed, the conditions, however, differ greatly inasmuch as the pressure in the interior of the bearing is inffective when the bearing is grease-filled and is counter-acted by the grease or grease cushion between the two sealing discs.

It is, therefore, an object of the present invention to provide an improved seal for grease-lubricated antifriction bearings.

It is a further object of this invention to provide a seal for an antifriction bearing, especially for a grease-lubricated and a high speed antifriction bearing which will have a particularly good sealing effect although the frictional forces are kept at a minimum and a sealing chamber is provided.

These and other objects and advantages of the invention will appear more clearly from the following specification in connection with the accompanying drawing in which:

FIG. 1 diagrammatically illustrates a section through a portion of an antifriction bearing provided with a seal according to the present invention.

Figure 2:
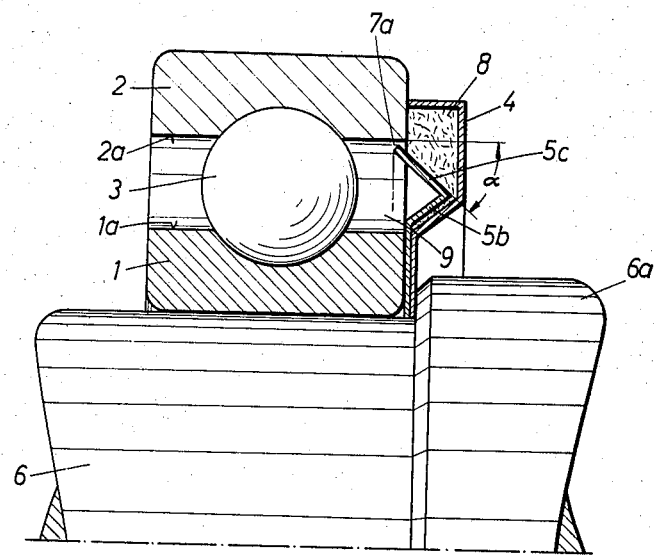

FIG. 2 is a section similar to that of FIG. 1 but with the inner sealing disc modified over that of FIG. 1.

The present invention is characterized primarily in that when employing two sealing discs arranged one behind the other, the inner disc extends into the annular chamber between the inner race ring and the outer race ring in such a way that it neither touches the inner wall surface of the bore of the outer race ring nor the outer peripheral surface of the inner race ring. More specifically, according to one embodiment of the present invention, the inner sealing disc is together with the outer sealing disc firmly clamped for instance against the inner race ring and while the marginal portion of the inner race ring extends into the bore of the outer race ring, it is slightly spaced from the bore surface of the race ring so as to confine therewith a narrow gap. The connection of the two sealing discs with the respective race ring, for instance the inner race ring, may be effected by clamping the two sealing discs firmly between the inner race ring or outer race ring and the shaft on which the antifriction bearing is mounted. That portion of the inner sealing disc which is adjacent the annular chamber between the two race rings may be of a trough-shaped cross section so as to easily catch the grease which may be thrown off and to guide said grease to the interior of the bearing.

Referring now more specifically to the drawing and FIG. 1 thereof in particular, the antifriction bearing shown therein comprises for instance an inner race ring 1 and an outer race ring 2 arranged concentrically with regard to the inner race ring and radially spaced therefrom while enclosing therebetween antifriction bodies, for instance in the form of balls 3. For purposes of sealing the bearing, there are provided an outer sealing disc 4 and an inner sealing disc 5. Both sealing discs are firmly connected to each other for instance by clamping the said two sealing discs between the inner race ring 1 and the larger diameter portion 6a of shaft 6.

The outer sealing disc 4 has its outer marginal portion bent substantially perpendicularly with regard to the end face 2a in such a way that the edge 4b of the marginal portion 4a is biased against and frictionally engages said end face 2a. According to the arrangement of FIG. 1, the inner disc 5 has its outer marginal portion 5a bent so that it extends into the annular chamber 9 confined by the inner race ring 1 and the outer race ring 2. However, as is clearly evident from FIG. 1, the marginal portion 5a which is substantially parallel to the inner bore surface 2a of ring 2 is slightly spaced from the latter so as to confine therewith a narrow gap 7 which acts as a fine sealing gap. In this way a heat development between the inner disc 5 and the outer race ring 2 will be avoided. In view of the fine gap 7, which may have a width of from 0.2 to 0.4 millimeter, the lubricant can escape only to a very minor extent.

The embodiment illustrated in FIG. 2 is rather similar to that of FIG. 1 inasmuch as it employs the same outer sealing disc 4. However, in contrast to the arrangement of FIG. 1, the outer marginal portion of the inner disc 5b is of a trough-shaped cross section. This trough-shaped cross sectional portion 5c has its free end portion extending into the annular chamber 9 between the inner race ring 1 and the outer race ring 2 in such a way that between the inner bore 2a' of outer race ring 2 and the outer edge of the marginal portion 5c there is provided a narrow annular gap 7a to prevent heat development between the inner bore surface 2a and the outer edge of marginal portion 5c. As will be evident from FIG. 2, the marginal portion 5c forms an acute angle with the inner bore surface 2a.

The chamber 8 between the two sealing discs 4 and 5 may in a manner known per se be filled with grease or the like in order additionally to prevent the escape of lubricant.

It is, of course, to be understood that the present invention is, by no means, limited to the particular constructions shown in the drawing but also comprises any modifications within the scope of the appended claim. Thus, while in FIGS. 1 and 2 the sealing discs are clamped between the larger diameter portion 6a and the inner race ring, it is also possible instead to clamp the two discs between the outer race ring 2 and a corresponding ring or the like. In such an instance, the inner marginal portions of the discs would then perform the function of the marginal portions 4a and 5a and 5c of the arrangement in FIGS. 1 and 2. In other words, the marginal portion 4a would engage the inner race ring 1 and the marginal portions 5a and 5c would form an annular gap with the surface 1a of the inner race ring.

What I claim is:

In combination with a grease-lubricated antifriction bearing having an outer race ring with an inner cylindrical wall surface and an inner race ring with an outer cylindrical wall surface so as to confine therewith an annular chamber: first sealing disc means having a plane inner marginal portion clamped against said inner race ring, an intermediate portion extending laterally and radially outwardly from said inner race ring, and an outer portion extending radially outwardly and laterally inwardly into said outer race ring, the margin of said outer portion being formed with a cylindrical flange closely spaced from said inner cylindrical wall surface of said outer race ring to avoid friction with said outer race ring and heating within the confined bearing space, second sealing disc means having a plane marginal portion clamped against the inner marginal portion of said first disc means, an intermediate portion extending radially and laterally outwardly parallel to said intermediate portion of said first disc means, and an outer plane portion extending radially outwardly and formed with a cylindrical portion extending laterally inwardly into contact with the side of said outer race ring, so that said outer portions of said disc means form a grease chamber therebetween.

References Cited by the Examiner

UNITED STATES PATENTS

| | | | |
|---|---|---|---|
| 1,965,985 | 7/1934 | Morgan | 308—187.1 X |
| 1,966,923 | 7/1934 | Couch | 308—187.1 X |
| 2,034,567 | 3/1936 | Fernstrom | 308—187.2 |
| 2,054,582 | 9/1936 | Delaval-Crow | 308—187.2 |
| 2,110,864 | 3/1938 | Batesole | 308—187.2 |
| 2,114,954 | 4/1938 | Brodin | 308—187.2 |
| 2,237,616 | 4/1941 | Smith | 308—187.2 |
| 2,286,472 | 6/1942 | Delaval-Crow | 308—187.2 X |
| 2,419,885 | 4/1947 | Cooper | 308—187.2 X |
| 2,688,521 | 9/1954 | Annen | 308—187.2 |
| 2,812,224 | 11/1957 | Richmond | 308—187.1 |

FOREIGN PATENTS

| | | |
|---|---|---|
| 897,188 | 11/1953 | Germany. |
| 1,069,967 | 11/1959 | Germany. |
| 825,364 | 12/1959 | Great Britain. |
| 278,690 | 7/1949 | Switzerland. |

DAVID J. WILLIAMOWSKY, *Primary Examiner.*

ROBERT C. RIORDAN, DON A. WAITE, *Examiners.*

F. C. HAND, F. SUSKO, *Assistant Examiners.*